United States Patent
Gabrys et al.

(10) Patent No.: US 6,585,490 B1
(45) Date of Patent: Jul. 1, 2003

(54) VACUUM REGENERATION METHOD FOR A FLYWHEEL SYSTEM

(75) Inventors: Christopher W. Gabrys, Reno, NV (US); David R. Campbell, Reno, NV (US)

(73) Assignee: Indigo Energy, Inc., Napa, CA (US)

( * ) Notice: Subject to any disclaimer, the term of this patent is extended or adjusted under 35 U.S.C. 154(b) by 0 days.

(21) Appl. No.: 10/025,275

(22) Filed: Dec. 19, 2001

Related U.S. Application Data (60) Provisional application No. 60/257,936, filed on Dec. 20, 2000.

(51) Int. Cl.[7] .................................................. F04B 37/02
(52) U.S. Cl. ............................ 417/51; 417/12; 310/74; 74/572; 74/574
(58) Field of Search .............................. 417/51, 12, 26, 417/240, 199.1; 310/74, 90; 74/573 R, 572, 574, 573 F (56) References Cited

U.S. PATENT DOCUMENTS

| | | | | |
|---|---|---|---|---|
| 3,609,426 A | * | 9/1971 | Gaul | 322/4 |
| 4,041,801 A | * | 8/1977 | Anderson | 74/572 |
| 4,233,858 A | * | 11/1980 | Rowlett | 475/5 |
| 4,312,669 A | | 1/1982 | Boffito et al. | 75/177 |
| 4,326,158 A | * | 4/1982 | Helgesen | 322/4 |
| 4,444,444 A | | 4/1984 | Benedetti et al. | 308/10 |
| 4,540,930 A | * | 9/1985 | Siedband | 322/4 |
| 4,730,154 A | * | 3/1988 | Pinson | 322/4 |
| 5,154,582 A | | 10/1992 | Danielson | 417/51 |
| 5,398,571 A | * | 3/1995 | Lewis | 74/572 |
| 5,462,402 A | | 10/1995 | Bakholdin et al. | 415/90 |
| 5,519,275 A | * | 5/1996 | Scott et al. | 310/112 |
| 5,614,777 A | * | 3/1997 | Bitterly et al. | 310/74 |
| 5,760,508 A | | 6/1998 | Jennings et al. | 310/74 |
| 5,912,519 A | | 6/1999 | Horner et al. | 310/74 |
| 5,969,446 A | | 10/1999 | Eisenhaure et al. | 310/74 |
| 6,175,172 B1 | * | 1/2001 | Bakholdin et al. | 310/74 |
| 6,262,505 B1 | * | 7/2001 | Hockney et al. | 310/90.5 |
| 6,323,573 B1 | * | 11/2001 | Pinkerton | 310/178 |
| 6,347,925 B1 | * | 2/2002 | Woodard et al. | 417/51 |

* cited by examiner

*Primary Examiner*—Charles G. Freay
*Assistant Examiner*—William H. Rodriguez
(74) *Attorney, Agent, or Firm*—J. Michael Neary (57) ABSTRACT

A vacuum management and regeneration apparatus and method for operating an energy storage flywheel system having a flywheel supported by a bearing system inside an evacuated chamber enclosed within a container. A motor/generator stores and retrieves energy by accelerating and decelerating the flywheel. A vacuum is maintained in the container with a vacuum level sufficient to reduce the aerodynamic drag on the flywheel, typically between $10^{-1}$ Torr to $10^{-3}$ Torr depending on the flywheel construction and its operating tip speed. The vacuum management system, including a vacuum pump and a timer, maintains the vacuum level in the container. The timer periodically enables operation of the vacuum pump, such as a mechanical vacuum pump or a getter pump, to reduce the pressure in the container. A vacuum gauge can be used, periodically activated by the timer, to measure the internal vacuum; if the internal pressure is above a certain allowable level, the vacuum pump can be started or activated to restore the vacuum. If the vacuum gauge is omitted, the timer periodically activates the vacuum pump directly.

22 Claims, 6 Drawing Sheets

VACUUM REGENERATION METHOD FOR A FLYWHEEL SYSTEM

This relates to a U.S. Provisional Application Serial No. 60/257,936 entitled "Vacuum Regeneration Method for a Flywheel Uninterruptible Power Supply" filed on Dec. 20, 2000.

This invention pertains to flywheel energy storage systems and more particularly to vacuum regeneration apparatus and method for a flywheel system that ensures sufficient operating vacuum and has long life with low costs.

BACKGROUND OF THE INVENTION

Flywheels have been used for many years as energy storage devices. They have often been used as power smoothing mechanisms for internal combustion engines and other kinds of power equipment. More recently, flywheels have been recognized as a very attractive energy storage technology for such electrical applications as uninterruptible power supplies, utility load leveling systems and electric vehicles.

Modem flywheel energy storage systems convert back and forth between the energy stored as rotational inertia in a spinning flywheel, and electrical energy. Such a flywheel energy storage system usually includes a flywheel, a motor generator, a bearing system and a vacuum enclosure. The rotating flywheel stores mechanical energy, the motor generator converts electrical (mechanical) energy to mechanical (electrical) energy and the bearing system physically supports the rotating flywheel.

In almost all energy storage applications, whether quick discharge type (power ride-through), where discharge time is measured in seconds, or long-term discharge type (power backup), where discharge time is measured in hours, flywheels directly compete with electrochemical batteries. Key advantages of flywheels used for electrical energy storage over electrochemical battery systems are its improved longevity and reliability, and its lower long term life cycle cost. Electrochemical batteries, in particular, lead-acid batteries, have short lifetimes, between six months and seven years depending on operating conditions. These batteries require periodic maintenance and can fail unpredictably. In contrast, flywheel energy storage systems are expected to have maintenance-free lifetimes of twenty years. To achieve a maintenance-free life of many years, the vacuum system that is used to prevent excessive drag and aerodynamic heating of the flywheel must be capable of reliably maintaining an adequate level of vacuum.

SUMMARY OF THE INVENTION

Accordingly, the invention provides a vacuum regeneration apparatus and method for operating a flywheel system that ensures sufficient operating vacuum and has long life with low costs. The flywheel system is comprised of a flywheel that is supported by a bearing system inside a chamber enclosed within a container. A motor/generator stores and retrieves energy by accelerating and decelerating the flywheel. The vacuum is maintained in the container with a vacuum level sufficient to reduce the aerodynamic drag on the flywheel, typically between $10^{-1}$ Torr to $10^{-3}$ Torr depending on the flywheel construction and its operating tip speed.

A vacuum management system, including a vacuum pump and a timer, maintains the vacuum level in the container. The timer periodically enables operation of the vacuum pump, such as a mechanical vacuum pump or a getter pump, to reduce the pressure in the container. In one embodiment, the timer periodically activates a vacuum gauge to measure the internal vacuum; if the internal pressure is above a certain allowable level, a mechanical vacuum pump is started and run for either a set period of time or until the internal pressure falls below a certain level. The periodic activation of the vacuum gauge by the timer, and mechanical pump by the gauge, instead of continuous operation, extends the life of both components and the flywheel system. In another embodiment, the vacuum gauge is eliminated, reducing the cost of the flywheel system and potentially improving reliability, and the timer periodically activates the vacuum pump directly. Understanding of the outgas rates of internal components as well as leak rates allows calculation of the interval when the mechanical pumping is necessary. The pump runs for a short period of time as also controlled by the timer. Because outgassing rates are temperature dependent, calculation of the pumping interval preferably is based on the warmest expected temperatures or on measured temperatures.

Besides use with conventional type mechanical pumps, the vacuum regeneration apparatus and method is also useful for getter vacuum pump flywheel systems. In this case, the vacuum management system includes a getter pump and a timer. Getter pumps can be either evaporable type or nonevaporable type, however use of nonevaporable type getters is preferred because of their both higher sorption capacity per cost and simpler operation. Metal alloy chemical type nonevaporable getters have a large sorbtion capacity for hydrogen, which facilitates long life in flywheel systems, although other types of getter pumps can be employed. In one embodiment, the timer periodically activates the vacuum gauge to measure the internal vacuum and, if the internal pressure is above a certain allowable level, the getter pump is reactivated.

For a nonevaporable metal alloy chemical type getter, reactivation is conducted by heating the getter material to several hundred degrees C, usually for a period of minutes. Hydrogen is normally sorbed to the center of the getter material. However, larger molecules get sorbed only at the surface at room temperature. Reactivation through heating allows the larger molecules to sorb to the center of the getter material, exposing a fresh outer surface. The timer activates power to an electric heater in contact with the getter material that causes reactivation. The timer also preferably turns off the heater after completion of the activation interval. The timer greatly extends the life of the vacuum gauge since it is turned on only periodically, and also controls the getter reactivation interval. In a further embodiment, the vacuum gauge is eliminated. Accurate understanding of the internal outgass rates and outgassing components can allow sufficiently accurate calculation of the rate of getter surface saturation. The timer therefore directly triggers reactivation of the getter periodically to maintain the desired internal pressure. Because the outgass rates will slow over time, the timer can optionally have an interval that also increases over time.

DESCRIPTION OF THE DRAWINGS

The invention and its many attendant advantages will become better understood upon reading the following description of the preferred embodiments in conjunction with the following drawings, wherein.

DESCRIPTION OF THE PREFERRED EMBODIMENT

Figure 1:
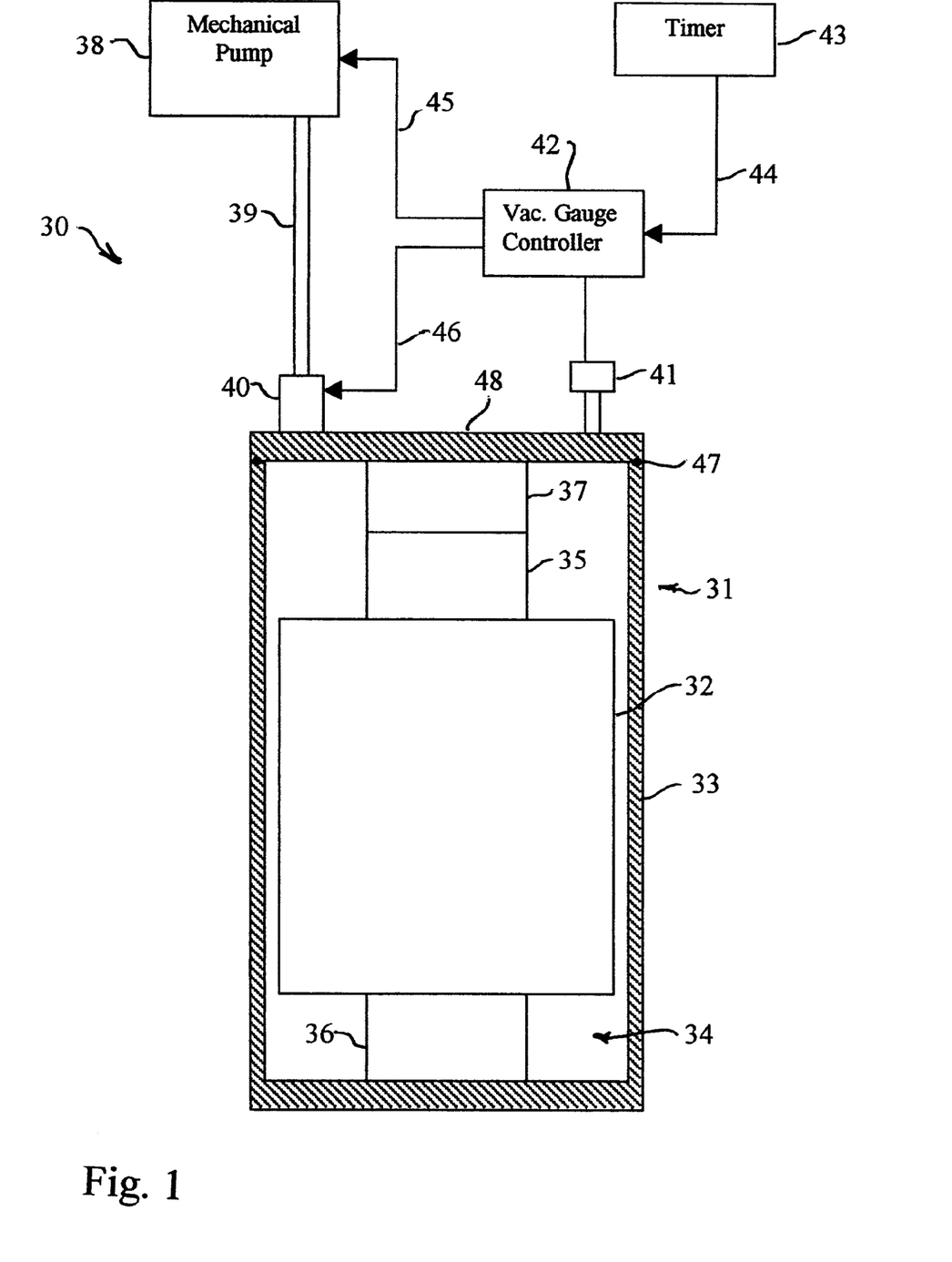
FIG. 1 is a schematic drawing of a flywheel energy storage system with vacuum regeneration in accordance with the invention.

Turning now to the drawings, wherein like characters designate identical or corresponding parts, FIG. 1 shows a flywheel energy storage system 30 with vacuum regeneration in accordance with the invention. The flywheel system 30 is constructed from a primary unit 31 having an internal flywheel 32 enclosed in an evacuated chamber 34 within a container 33 for reduction of aerodynamic drag on the flywheel 32. The container 33 has a cover or lid 48 that is sealed on the container 33, preferably by welding or brazing. However, in some applications it may be desirable to be able to open the container 33 for servicing, in which case the lid 48 can be sealed to the container 33 using an 'O' ring 47 or other conventional sealant.

The flywheel 32 can be constructed from metal such as steel or of composite materials. Composite material flywheels typically operate at higher tip speeds and they exhibit lower temperature capability and thermal conductivity than do steel flywheels. Therefore they usually require a higher level of vacuum so as to reduce drag and also to prevent unacceptable flywheel heating. The required vacuum level for flywheel systems typically ranges from $10^{-1}$ Torr to $10^{-3}$ Torr depending on the flywheel construction, operating speed and allowable level of drag.

The flywheel 32 is supported on upper and lower bearings 35 and 36. The bearings can be mechanical, magnetic or a combination of the two. Any type of bearings that can reliably support the flywheel for long life operation at the operating speed and in vacuum can be employed.

The flywheel 32 is accelerated and decelerated for storing and retrieving energy by a motor/generator 37. The motor/generator 37 is preferably brushless for long operating life while typical configurations include permanent magnet, reluctance or inductance types.

Because all materials outgass and because of any leak rates from seals or 'O' rings 47, the internal vacuum will degrade over time unless the chamber 34 is pumped. To maintain the vacuum in the chamber 34, a mechanical vacuum pump 38 communicating with the chamber 34 is operated intermittently. Continuous operation would rapidly wear the pump 38 and is unnecessary. Mechanical pumps can be of various types including scroll pumps, rotary vane, piston, diaphragm or others. Rotary vane and diaphragm pumps typically have lower costs. Diaphragm pumps have the advantage of being oil free but they usually require more than 1 stage to achieve the necessary low pressure. The mechanical pump 38 communicates with the chamber 34 through a tube 39 and a solenoid valve 40 opens and closes the connection. If the mechanical pump 38 has sufficiently low leak rate, then the valve 40 can be eliminated.

The internal vacuum in the chamber 34 is measured with a vacuum gauge 41 attached to the container 33. The vacuum gauge can be any type capable of measuring the desired flywheel operating pressure such as thermocouple, Pirani or capacitance types. Thermocouple type gauges are preferred because of their low cost and simplicity. The vacuum gauge 41 is connected to a vacuum gauge controller 42 that operates the gauge.

The vacuum gauge controller 42 is periodically activated by a timer 43 to measure the vacuum in the chamber 34. The timer 43 extends the life of the vacuum gauge 41 by enabling its operation it only periodically instead of continuously. When the timer 43 triggers the vacuum gauge controller 42 through connection 44, the controller applies power to the vacuum gauge 41 and measures the vacuum in the chamber 34. If the internal pressure in the chamber 34 is above the allowable level, the vacuum controller 42 turns on the vacuum pump 38 through connection 45, and opens the solenoid valve 40 through connection 46 to reduce the internal pressure in the chamber 34. The mechanical pump 38 can run for a set period of time as set by the timer 43, or alternatively can run until it reduces the pressure in the chamber 34 below a threshold value pre-set in the vacuum gauge controller 42. It may be advantageous for the mechanical pump 38 to start pumping prior to opening the solenoid valve 40 and likewise for the solenoid valve to close prior to stopping the mechanical pump pumping.

Figure 2:
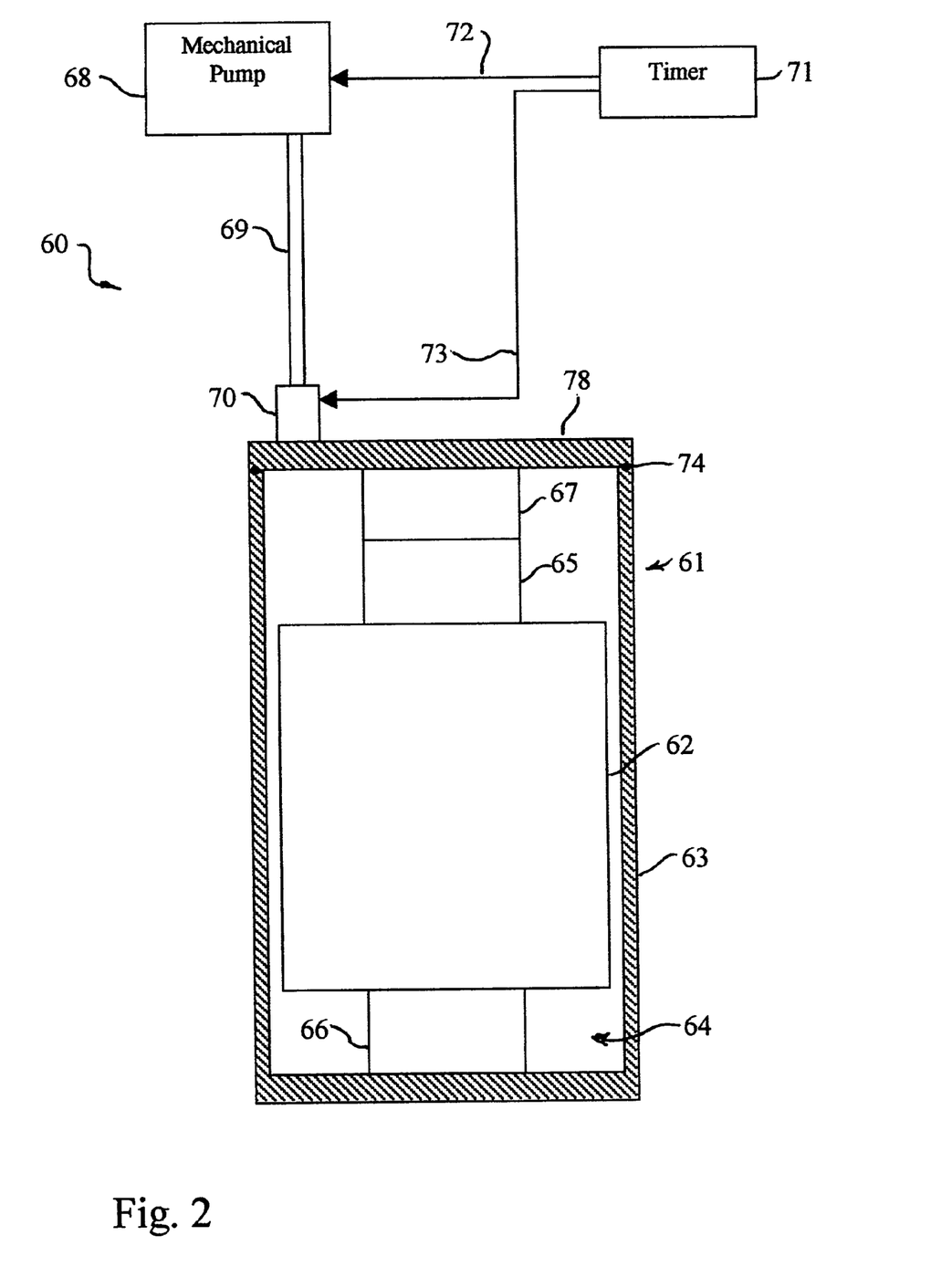
FIG. 2 is a schematic drawing of an alternate configuration flywheel energy storage system with vacuum regeneration in accordance with the invention.

In most applications, it is advantageous to minimize the costs of the flywheel system and also to maximize its reliability. One way to do this, which is based on accurately predicting the rate of pressure rise in the container of the flywheel system, is to eliminate the vacuum gauge 41 and vacuum gauge controller 42. Such an alternate configuration flywheel energy storage system 60 with vacuum regeneration in accordance with the invention, shown in FIG. 2, is comprised of a primary unit 61 having an internal flywheel 62 in an evacuated chamber 64 enclosed within a container 63. The container 63 has a lid 78 that is sealed to the container 63 to have a very low leak rate. The lid 78 can be welded closed on the container 63, or a removable seal such as an 'O' ring 74 or other conventional sealant can be used if the internal components require servicing. A metal gasket, such as a Nitinol seal shown in U.S. Pat. No. 5,226,683, could alternatively be used to provide a removable seal with lower permeation rate, however these are somewhat expensive in large diameters required for insertion of the flywheel 62.

The flywheel 62 is supported for rotation on upper and lower bearings 65 and 66. A motor/generator 67 accelerates and decelerates the flywheel 62 for storing and retrieving energy. A separate motor and generator could be used as well as an integrated motor/generator flywheel rotor. Electrical connections for the motor/generator 67, bearings 65, 66 or other components can exit the container 63 through use of vacuum feedthroughs, hermetic seals or epoxy potting, not shown. The vacuum 64 is maintained through use of a mechanical pump 68 that is connected to the container 63 through a tube 69 or a separate vacuum-tight pass-through. A solenoid valve 70 opens and closes the connection between the mechanical pump 68 and the container 63. In this configuration of the invention, a timer 71 periodically activates both the solenoid valve 70 and the mechanical pump 68 through connections 73 and 72. The period of the timer is based on a predicted outgassing and leakage rate such that the internal vacuum 64 never exceeds a desired maximum operating pressure.

Figure 3:
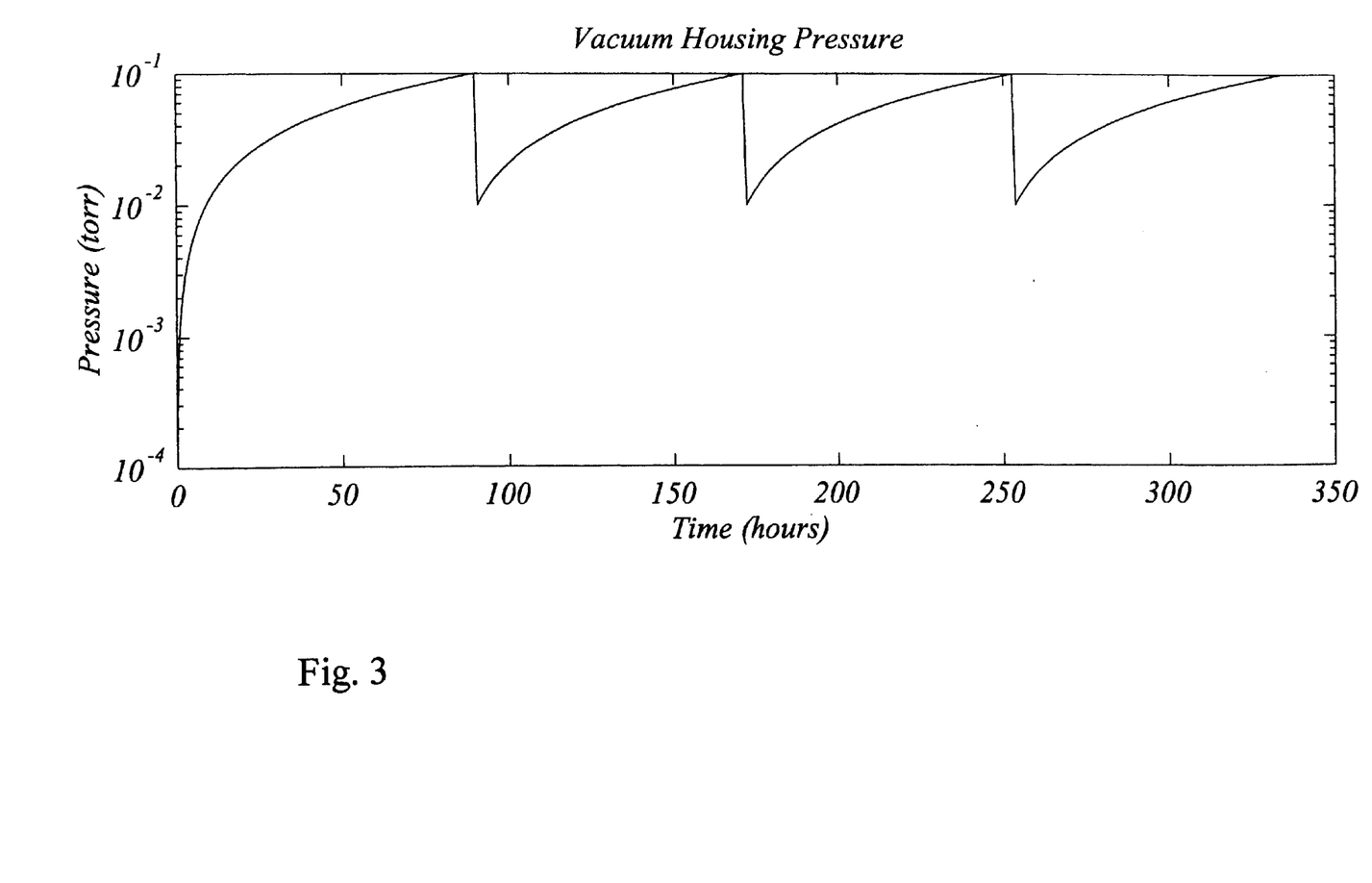
FIG. 3 is a graph of pressure versus time in the flywheel energy storage system of FIG. 2.

The pressure versus time in one particular example of the flywheel energy storage system 60 of FIG. 2 is shown in FIG. 3. The internal pressure in the chamber 64 is calculated based on an internal surface area of $2.4 \times 10^{-4}$ cm$^2$ and internal volume of 5.18 liters. The outgass rate of hydrogen was assumed to be $2.41 \times 10-7$ torr 1/cm$^2$/h. Other outgass components were not included for simplicity of calculation. Obviously, other flywheel system sizes, areas, volumes and outgass components and rates would be used based on the actual system. The container lid 78 is welded closed on the container 63. Use of an 'O' ring seal would result in a faster rate of rise in pressure due to leakage. The internal components are assumed to have been cleaned to remove high outgassing contaminates.

Before operation of the flywheel system, the container is preferably heated and pumped continuously to remove internal moisture that would more rapidly deteriorate the vacuum. The heating can be done to 120° C. or whatever the internal components can safely withstand. It is possible to skip heating of the system for removal of internal water with the consequence of requiring more frequent pumping.

As shown in FIG. 3, the container is initially pumped down to a pressure as low as possible to remove most of the internal water. For the mechanical pump used, a pressure of $10^{-3}$ Torr is achieved. Pressures below $10^{-4}$ usually require use of a molecular drag or turbomolecular pump, which are significantly more expensive. When the target pressure is reached, or after running the pump for a predetermined time period, the solenoid valve is closed and the pump is turned off. The internal pressure gradually rises inside the container. After roughly 85 hours, the pressure reaches $10^{-1}$ Torr which is the upper allowable limit for the given flywheel system. The timer then activates the solenoid valve and mechanical pump every 85 hours to reactivate the internal vacuum. As shown, the vacuum pump has to operate only for a very short period of time, on the order of seconds to minutes, to reestablish the vacuum to $10^{-2}$ Torr. Short periods of operation periodically rather than continuous operation prolongs the life of the vacuum pump, and no vacuum gauge and controller are needed. Both factors increase the reliability of the flywheel system and reduce the initial and operating costs.

Figure 4:
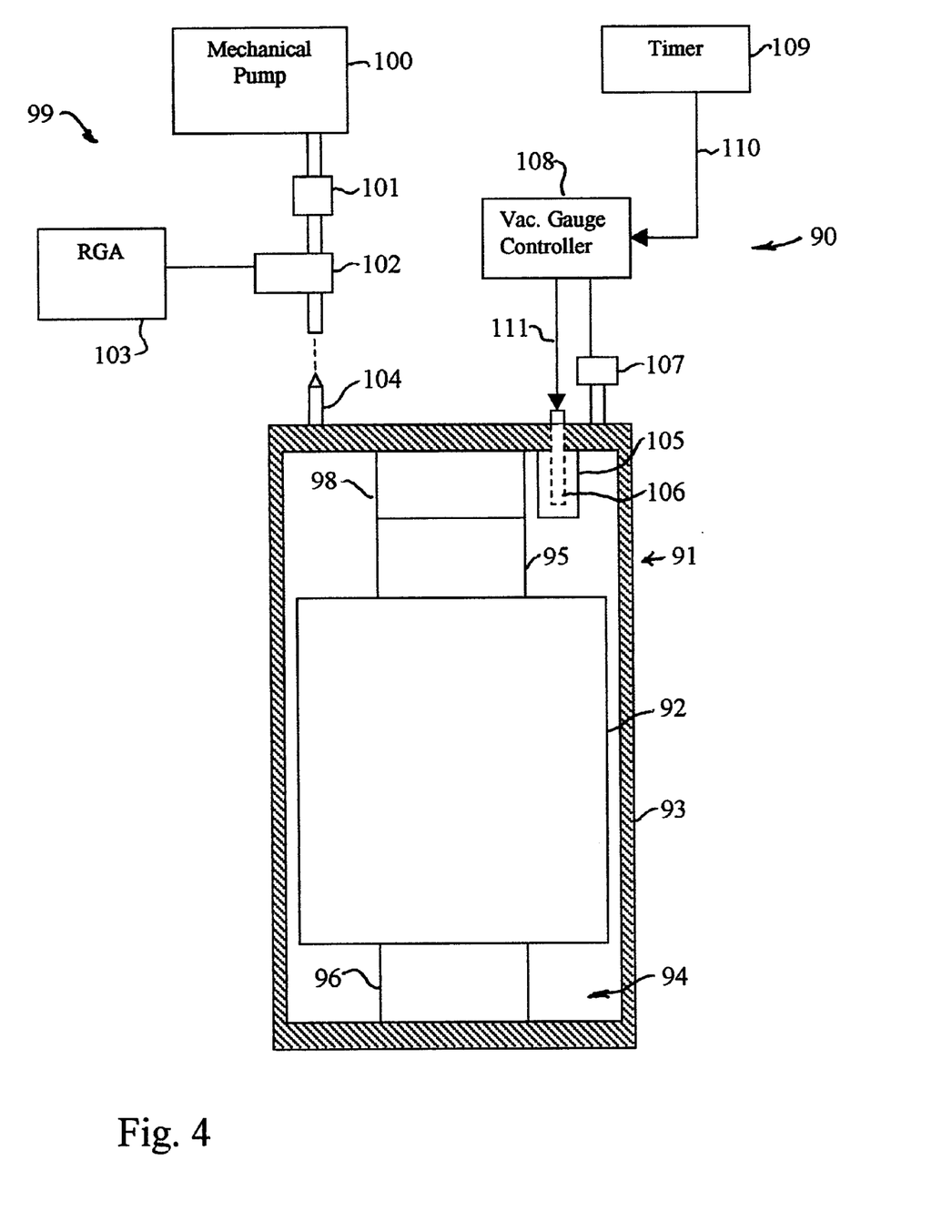
FIG. 4 is a schematic drawing of a second alternate configuration flywheel energy storage system with vacuum regeneration in accordance with the invention.
Figure 5:
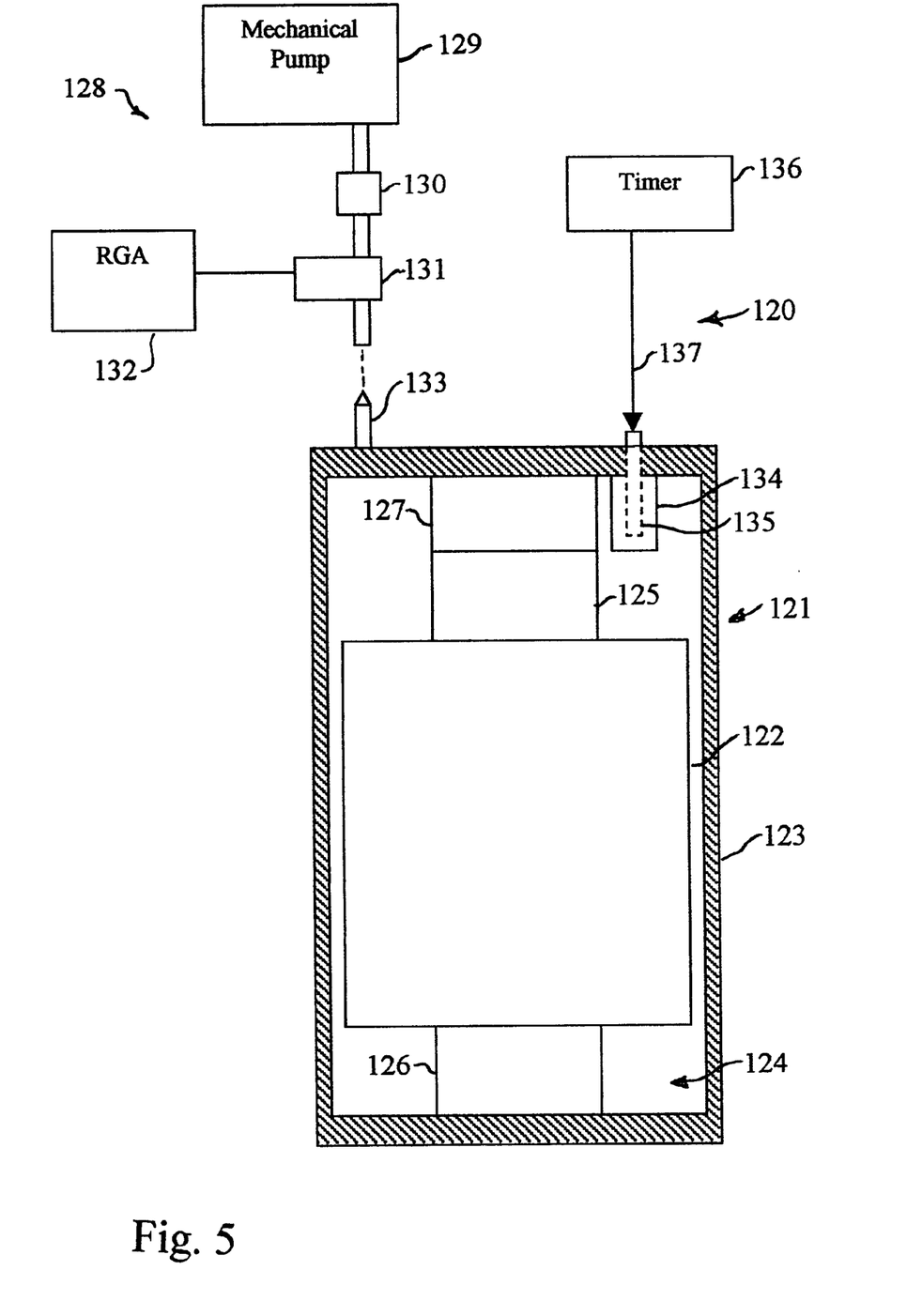
FIG. 5 is a schematic drawing of a third alternate configuration flywheel energy storage system with vacuum regeneration in accordance with the invention.

During high power discharge of the flywheel energy storage systems 60, 90 and 120, the motor/generator normally gets hot. Since outgassing is an exponential function of temperature, the low pressure in the chamber can be maintained with minimal pressure peaks by reactivating the vacuum pump after every discharge cycle. This can be accomplished simply be resetting the timer to the end of its cycle after the end of every discharge. The timer will then operate normally to initiate a pressure measurement operation or directly a pump operation cycle.

An advantage of a mechanical pump over a getter pump is that a mechanical pump readily pumps hydrocarbons which outgass abundantly from some components that may be used in a flywheel energy storage system, such as composite flywheels, potting material and mechanical bearings. However, in some flywheel systems which minimize the use of components that have high hydrocarbon outgass rates, it is possible to maintain the internal vacuum without the use of an external mechanical vacuum pump. Although a getter pump cannot normally adsorb hydrocarbons when operated at room temperature, when the internal outgassing of the flywheel and components can be made sufficiently low, a getter pump can be used to maintain the vacuum.

Use of a getter pump is particularly well suited for use with a steel flywheel because a steel flywheel has-outgass rates roughly 1000 times less than composite flywheels, and because steel outgases primarily hydrogen, which is readily sorbed by certain types of getters. Getters can be of the evaporable type or noneveaporable type. Evaporable type getters such as barium or titanium sublimation pumps evaporate the base material onto the internal surfaces of the vacuum container. The fresh coated surfaces sorb gasses to maintain the vacuum. These can be used with flywheel systems but are not preferable because they are expensive, have slow pumping rates and limited capacities and are better suited for high vacuum applications. Nonevaporable metal alloy chemical type getters are preferred for maintaining the vacuum in a flywheel system due to their large capacity per cost and matching preferred solubility for outgassed hydrogen.

A second alternate configuration flywheel energy storage system 90 with vacuum regeneration in accordance with the invention, shown in FIG. 4, is comprised of a primary unit 91 and a separate vacuum establishment system 99. The primary unit 91 is comprised of a flywheel 92 that is housed in an evacuated chamber 94 within a sealed container 93. For the lowest outgas rates and for reduced outgassing of larger gas molecule species that are more difficult to sorb, the flywheel is preferably constructed from metal, preferably high strength steel. A composite flywheel could be employed, but the composite outgases significantly more. The flywheel 92 is supported on upper and lower bearings 95 and 96. A motor/generator 98 accelerates and decelerates the flywheel 92 for storing and retrieving energy. The container 93 is preferably welded or brazed closed and electrical connections through the container 93 preferably use standard hermetic vacuum feedthroughs, not shown.

All components and the inside of the container 93 are thoroughly cleaned prior to assembly to remove oils and greases and other high outgassing contaminates. The internal vacuum is initially established in the chamber 94 by the vacuum establishment system 99. The vacuum establishment system 99 comprises a mechanical pump 100, valve 101, ion gage 102 and a residual gas analyzer 103. The mechanical pump 100 is preferably a high vacuum pump such as a molecular drag pump that is capable of achieving pressures as low as $10^{-6}$ Torr. The vacuum establishment system 99 connects to the container 93 through a pinch-off tube 104. The container 93 is heated to roughly 120° C. or the maximum that the primary unit 91 can safely withstand. The outgassing is an exponential function of the temperature so heating reduces the time required to remove internal water and contaminates. The drag pump 100 pumps on the container preferably until the ion gage 102 reads a pressure of $1 \times 10^{-6}$ Torr or less. This usually signals that most of the water in the system has been removed. The valve 101 is then closed and the residual gas analyzer measures the rate of rise of internal gas species pressures. Because a getter pump will be used to maintain the vacuum over the life of the flywheel system and it has different sorption characteristics for different gasses, knowing the outgassing rates of the different species is important for both determining if the initial vacuum is adequate and what the reactivation interval should be. After some assembly experience, the residual gas analyzer 103 may not be required and a general knowledge of the rate of pressure rise may be all that is necessary. When the initial vacuum is sufficiently good and the rate of rise of internal pressure is acceptable. The pinch-off tube 104 is crimped shut and the vacuum establishment system 99 is disconnected. The pinch-off tube can be welded or brazed for added security or a valve could alternatively be used.

During operation of the flywheel energy storage system 90 over an extended time period of years, the internal vacuum in the chamber 94 is maintained using a getter pump 105. The getter pump is preferably a nonevaporable metal alloy chemical type getter such as the composition ZrVFe, which is sold by SAES Getters under the trade name St-707. The getter pump 105 preferably is constructed with pellets of ZrVFe located in a contact with an electrical heater 106. The porous pellets can be held in a ventilated steel can or any other structure that allows efficient gas flow. The heater 106 can be electrically energized to heat the getter 105 to several hundred degrees for several minutes for activation. For lower temperatures, activation takes longer time but a typical activation schedule is 450° C. for 15 minutes. Activation allows larger gas molecules that were sorbed on the surface to be sorbed to the center of the pellets, thus exposing a fresh surface for sorption of more gas molecules. Hydrogen, which is a very small molecule readily sorbs to the center without reactivation. It is also partially released during reactivation. For this reason, the getter pump 105 is preferably initially activated when the vacuum pump 100 is still connected to the container 93, so that the pump 100 can remove the hydrogen that is released.

The getter pump 105 maintains the internal vacuum 94 but the surface of the getter material will eventually become filled over time. Once filled, larger gas molecules will no longer be efficiently sorbed and thus the internal pressure will increase. The getter will preferably operate at a low pressure usually below $10^{-6}$ Torr. When the surface of the getter 105 becomes saturated, the internal pressure will rise. A timer 109 periodically signals a vacuum gauge controller 108 through connection 110 to measure the internal pressure in the chamber 94. The vacuum gauge control activates a vacuum gauge 107, operatively connected with the container 93. Although the internal operating pressure in the chamber 94 is typically in the moderate to high vacuum range of less than $10^{-4}$ Torr, which is measurable with ion gages, use of a lower priced vacuum gage such as a thermocouple gage is preferred. Ion gages are delicate, expensive and have shorter lives. It is also unnecessary to measure the vacuum at very low pressures. If the vacuum in the chamber 94 is measured to be above a certain allowable level such as $10^{-1}$ to $10^{-3}$, the vacuum gage controller activates the getter heater 106 through electrical connection 111. The activation of the heater 106 can be continued until the internal pressure drops below a certain value or more preferably for a set interval also controlled by the timer.

As discussed previously, it is usually desirable to reduce the costs of the flywheel system as much as possible and to increase its reliability. If the outgassing of the internal components and the container are known, the vacuum gauge and its controller may be eliminated. A third alternate configuration flywheel energy storage system 120, in accordance with the invention, is shown in FIG. 5 with vacuum regeneration and without a vacuum gauge and its controller. The flywheel system 120 is comprised of a primary unit 121 and a vacuum establishment system 128. The primary unit 121 includes a flywheel 112 that is housed in an evacuated chamber 124 within a sealed container 123. The flywheel 122 is supported by upper and lower bearings 125 and 126 and is accelerated and decelerated with a motor/generator 127.

The vacuum 124 is initially established with the vacuum establishment system 128. A high vacuum pump 129, such as a molecular drag type, pulls a vacuum on the container 123 through a pinch-off tube 133. The molecular drag pump typically requires an oil-less backing pump such as a diaphragm pump or other type as is well known in the art. The container 123 is heated to facilitate removal of internal water and contaminates as the mechanical pump 129 is pumping. The process may take several hours depending on the cleanliness and types of flywheel system component materials. The pressure in the container 123 is measured by an ion gage 131 connected to a residual gas analyzer 132. After reaching a pressure, preferably of about $10^{-6}$ Torr or less, the valve 130 can be closed and the rates of partial pressure rises can be determined by use of the residual gas analyzer 132. If the outgassing is too high, pumping can be continued.

When the vacuum reaches an acceptable stable level, the internal getter pump 134 is activated. The getter 134 is preferably a nonevaporable metal alloy getter that is activated by use of an electric heater 135. The mechanical pump 129 preferably pumps away any released hydrogen during activation. Once activation of the getter 134 is complete, the pinch-off tube 135 is crimped and the vacuum establishment system 128 is disconnected. Based on the rate of rise calculations of the outgassing inside the container 123, the getter is reactivated periodically. Because the outgassing is a function of temperature, the maximum component temperatures can be used for the calculation purposes. A timer 136 periodically activates the getter heater 135 through electrical connection 137. The timer 136 also controls the duration of the heating, which is much less than the interval between heating cycles.

Figure 6:
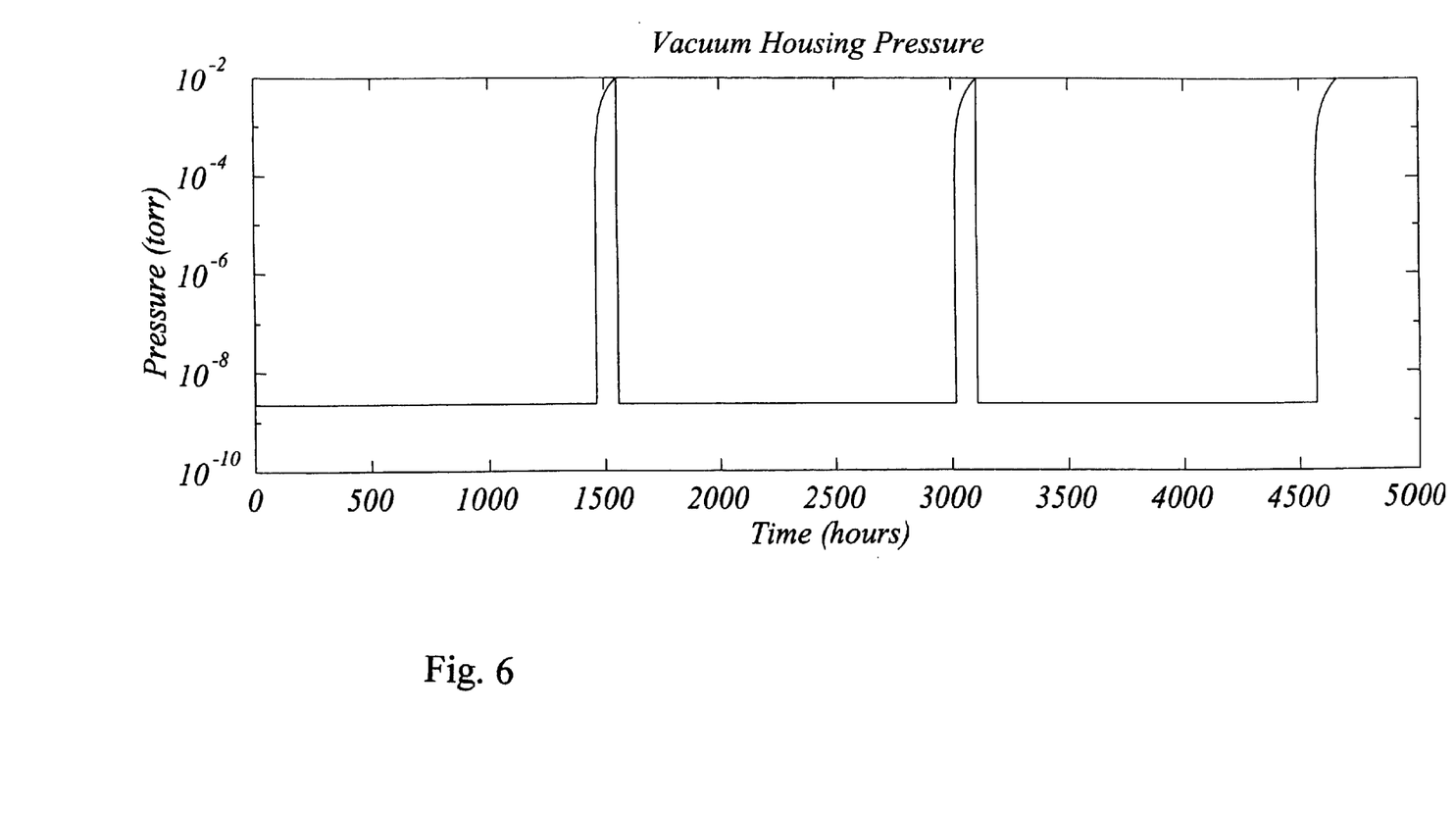
FIG. 6 is a graph of pressure versus time in the flywheel energy storage system of FIG. 5.

The pressure versus time in the flywheel energy storage system of FIG. 5 is shown in FIG. 6. The flywheel system uses the same outgassing parameters as used previously. The internal pressure is calculated based on an internal surface area of $2.4 \times 10^{-4}$ cm$^2$ and internal volume of 5.18 liters. The outgass rate of hydrogen was assumed to be $2.41 \times 10^{-7}$ torr 1/cm$^2$/h. Other outgass components were not included for simplicity of calculation. Obviously, other flywheel system sizes, areas, volumes and outgass components and rates would be used based on the actual system.

The flywheel container 123 is initially pumped down to a pressure lower than $10^{-8}$ Torr through use of the mechanical pump 129 while the getter 134 is being activated. When the desired pressure is reached and is stabile, the container 123 is sealed by crimping of the pinch-off tube 133. Thereafter, the vacuum level remains at an essential constant pressure until the surface of the getter 134 becomes saturated. The pressure then increases because the outgassing rate is greater than the getter sorption rate. The getter 134 is then reactivated and the pressure again drops below $10^{-8}$ Torr. The timer 136 reactivates the getter 134 periodically at an interval short enough to prevent pressure in the container 123 becoming unacceptably too high. In the example shown, the timer 136 reactivates the getter 134 when the pressure reaches approximately $10^{-2}$ Torr. Because the outgassing rates of the internal components and the container 123 will decrease over the life of the flywheel system, the interval between activation can be increased if desired. In one embodiment of the invention, the interval of the timer 136 increases over time. This extends the life of the getter and heater and reduces power consumption. It does add complexity and may not be desirable for use in all applications.

The timer in the embodiments of FIGS. 1, 2, 4, 5, can be a combination of two timers: a first timer for controlling a first period which is the interval between activation of the mechanical or getter vacuum pump, and a second timer for controlling a second period, which is the duration of mechanical or getter pump operation. The ratio of the first time period to the second time period is at least 50 and preferably between 50–100 or greater.

The mechanical pump scheme described may be used with an auxiliary turbomolecular or turbodrag pump, as described in the getter pump embodiments of FIGS. 4 and 5, to initially reduce the amount of water vapor and other gas species within the system. This will increase the life of the mechanical pump as it may not have to be activated as regularly.

Obviously, numerous other modifications, combinations and variations of the preferred embodiments described above are possible and will become apparent to those skilled in the art in light of this specification. For example, many functions and advantages are described for the preferred embodiments, but in some uses of the invention, not all of these functions and advantages would be needed. Therefore, we contemplate the use of the invention using fewer than the complete set of noted functions and advantages. Moreover, several species and embodiments of the invention are disclosed herein, but not all are specifically claimed, although all are covered by generic claims. Nevertheless, it is our intention that each and every one of these species and embodiments, and the equivalents thereof, be encompassed and protected within the scope of the following claims, and no dedication to the public is intended by virtue of the lack of claims specific to any individual species. Accordingly, it is expressly intended that all these embodiments, species, modifications and variations, and the equivalents thereof, are to be considered within the spirit and scope of the invention as defined in the following claims, wherein we claim:

1. A flywheel energy storage system comprising:
   a flywheel for rotation about an axis, and supported by a bearing system inside an enclosed container;
   a motor and generator means for accelerating and decelerating said flywheel for storing and retrieving energy;
   a vacuum management system that maintains vacuum inside said enclosed container for reducing aerodynamic drag;
   said vacuum management system comprising a timer that enables a vacuum pump to reduce the pressure in said container.

2. A flywheel energy storage system as described in claim 1 wherein:
   said vacuum pumping means is a mechanical vacuum pump.

3. A flywheel energy storage system as described in claim 2 wherein:
   said timer periodically activates a pressure measuring device to measure the level of vacuum inside said enclosed container and said mechanical vacuum pump is engaged to reduce the internal pressure if it is above a certain level.

4. A fly Wheel energy storage system as described in claim 3 wherein:
   said pressuring measuring device is a vacuum gauge that operates in the range between $10^{-4}$ Torr and $10^{-2}$ Torr.

5. A flywheel energy storage system as described in claim 4 wherein:
   said vacuum gauge is a thermocouple type gauge.

6. A flywheel energy storage system as described in claim 2 wherein:
   said timer periodically triggers said mechanical vacuum pump to reduce the internal pressure if it is above a certain level.

7. A flywheel energy storage system as described in claim 6 wherein:
   the period of said timer increases over time.

8. A flywheel energy storage system as described in claim 6 wherein:
   said timer turns off said mechanical vacuum pump after another shorter period of time.

9. A flywheel energy storage system as described in claim 1 wherein:
   said vacuum pump is a getter pump.

10. A flywheel energy storage system as described in claim 9 wherein:
    said timer periodically activates a pressure measuring device to measure the level of vacuum inside said enclosed container and said getter pump is reactivated to reduce the internal pressure if it is above a certain level.

11. A flywheel energy storage system as described in claim 10 wherein:
    said pressuring measuring device is a vacuum gauge that operates in the range between $10^{-4}$ Torr and $10^{-2}$ Torr.

12. A flywheel energy storage system as described in claim 11 wherein:
    said vacuum gauge is a thermocouple type gauge.

13. A flywheel energy storage system as described in claim 9 wherein:
    said timer periodically triggers reactivation of said getter pump to reduce the internal pressure if it is above a certain level.

14. A flywheel energy storage system as described in claim 13 wherein:
    the period of said timer increases over time.

15. A flywheel energy storage system as described in claim 13 wherein:
    said timer turns off reactivation of said getter pump after another shorter period of time.

16. A flywheel energy storage system as described in claim 9 wherein:
    said getter pump comprises nonevaporable getter material in contact with an electrical heater.

17. A flywheel energy storage system comprising:
    a flywheel for rotation about an axis, and supported by a bearing system inside an enclosed container;
    a motor and generator means for accelerating and decelerating said flywheel for storing and retrieving energy;
    a mechanical vacuum pump operatively connected with said enclosed container that only operates periodically as determined by a timer.

18. A flywheel energy storage system comprising:
    a flywheel for rotation about an axis, and supported by a bearing system in a chamber inside a container;
    a motor and generator means for accelerating and decelerating said flywheel for storing and retrieving energy;
    a getter vacuum pump operatively communicating with said chamber and in a heat-receiving position to an electrical heater;
    a timer for periodically connecting said electrical heater to a source of electrical power for heating and reactivating said getter vacuum pump periodically as determined by said timer.

19. A method for regenerating a vacuum in a flywheel energy storage system comprising:
    triggering a vacuum measuring device periodically with a timer to measure the internal pressure inside a container surround the flywheel; and
    operating a vacuum pump to reduce internal pressure inside said container surrounding said flywheel if said vacuum measuring device indicates that said internal pressure is above a predetermined level.

20. A method for regenerating a vacuum in a flywheel energy storage system comprising:

a timer triggering a vacuum pumping means to reduce the internal pressure inside the container surrounding said flywheel.

21. A flywheel energy storage system comprising:

a flywheel for rotation about an axis, and supported by a bearing system inside a chamber enclosed within a container;

a motor and generator means for accelerating and decelerating said flywheel for storing and retrieving energy;

a vacuum management system including a periodically activated vacuum pump for maintaining a vacuum inside said chamber for reducing aerodynamic drag;

said vacuum management system including a first timer for controlling a periodic interval with a first time period between activation of said vacuum pump to reduce the pressure in said container, and a second timer controlling the duration of the activation with a second time period;

wherein a ratio exists of said first time period to said second time period, said ration being greater than or equal to 50.

22. A flywheel energy storage system as defined in claim 21, wherein:

said vacuum pumping means is also activated by after a discharge of said flywheel and after charging power has been reestablished.

* * * * *